United States Patent [19]

Uchman

[11] Patent Number: 5,019,016
[45] Date of Patent: May 28, 1991

[54] ANTI-SHUDDER TRIPOD CONSTANT VELOCITY UNIVERSAL JOINT

[75] Inventor: Frederick J. Uchman, Clarkston, Mich.

[73] Assignee: GKN Automotive Inc., Auburn Hills, Mich.

[21] Appl. No.: 507,022

[22] Filed: Apr. 10, 1990

[51] Int. Cl.$^5$ .............................................. F16D 3/20
[52] U.S. Cl. ..................................... 464/111; 464/905
[58] Field of Search ............... 464/111, 123, 124, 132, 464/905

[56] References Cited

U.S. PATENT DOCUMENTS

| | | | |
|---|---|---|---|
| 3,613,396 | 10/1971 | Drevard | 464/111 |
| 3,757,534 | 9/1973 | Orain | 464/111 |
| 3,818,721 | 6/1974 | Wahlmark | 464/111 |
| 4,371,356 | 2/1983 | Dore | 464/111 |
| 4,379,706 | 4/1983 | Otsuka et al. | 464/124 X |
| 4,472,156 | 9/1984 | Orain | 464/111 |
| 4,505,688 | 3/1985 | Peterson | 464/111 |
| 4,578,048 | 3/1986 | Hirai et al. | 464/905 X |
| 4,747,803 | 5/1988 | Kimata et al. | 464/905 X |
| 4,854,917 | 8/1989 | Mizukoshi | 464/905 X |
| 4,886,479 | 12/1989 | Richtmeyer et al. | 464/111 |
| 4,891,035 | 1/1990 | Sasaki et al. | 464/111 |

Primary Examiner—Thomas R. Hannon

[57] ABSTRACT

An anti-shudder tripod constant velocity universal joint having an outer member and an inner member. The outer member has an internal cavity having three lobes, each of which has a pair of face-to-face longitudinal guideways for a roller. The inner member has three radially extending trunnions which individually extend into a respective one of the three lobes. The rollers are a multiple component roller having an inner race member pivotably attached to each trunnion by mating spherical surfaces. A roller member is rotatably attached to each inner race member by a plurality of roller bearings disposed therebetween. The roller member is free to move axially with respect to the inner race member along the roller bearings when the inner member is angularly disposed relative to the outer member to keep the rollers in the guideways. A circumferential lip and a retainer ring attached to the inner race member captivates the roller member therebetween and maintains the roller member in rolling contact with the roller bearings.

15 Claims, 1 Drawing Sheet

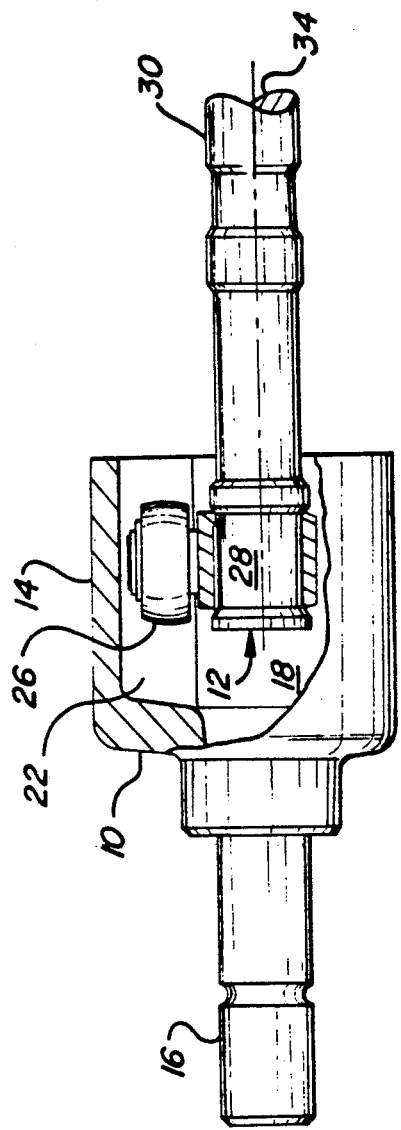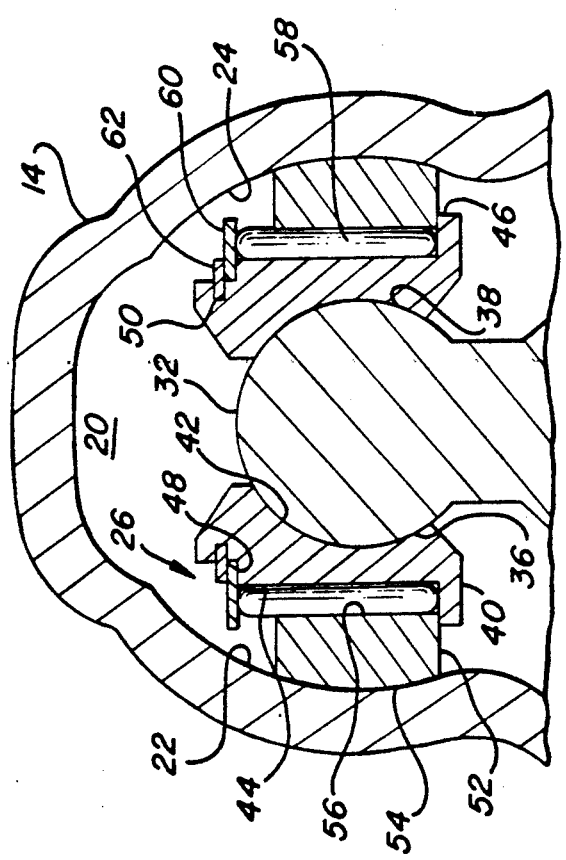

ANTI-SHUDDER TRIPOD CONSTANT VELOCITY UNIVERSAL JOINT

BACKGROUND OF THE INVENTION

1. Field of the Invention

The invention is related to the field of tripod constant velocity universal joints and in particular to a tripod constant velocity joint in which the roller is pivotable and radially displaceable relative to the trunnion on which it is mounted.

2. Description of the Prior Art

Tripod constant velocity universal joints such as taught by Devard et al, in U.S. Pat. No. 3,613,396 or Orain in, U.S. Pat. No. 3,757,534, have an inner joint member and an outer joint member. Conventionally, the inner joint member has three radially extending trunnions equally spaced about the inner joint member's axis of rotation. A roller is journaled on each of the trunnions which engage a pair of parallel guideways or tracks provided in the outer joint member. In the early development of these universal joints, the trunnions were cylindrical and the rollers were journaled to the trunnions using roller or pin bearings disposed between the trunnion and the roller. Resilient means were normally provided for movement of the roller relative to the trunnion when the inner joint member was angularly disposed with respect to the outer joint member. In these constant velocity or universal joints, the plane of the roller generally remains parallel to the axis of rotation of the inner joint member. Therefore, when the inner joint member is at an angle to the outer joint member, the roller is at an angle to the guideway causing a compound motion of the roller along the guideway. Part of this motion was a sliding motion of the roller in the guideway which caused the joint to shudder and decrease the efficiency of the universal joint. In some of these universal joints, the guideways were made flat. This solution solved some problems but created new ones.

Wahlmark, in U.S. Pat. No. 3,818,721, provided a first solution to this problem through the use of trunnion members utilizing a multiple component roller in which the mating surfaces of at least two of the roller components mate in drive channels so that the outer roller member could pivot relative to the axis of the trunnion. Therefore, the roller could remain parallel to the guideways even when the inner joint member was angularly disposed relative to the outer joint member. Wahlmark teaches the use of a multiple component roller bearing between an inner roller member and an outer roller member.

In contrast to the teachings of Wahlmark, Orain, in U.S. Pat. No. 4,472,156, teaches the use of diabolo-shaped bearings between the spherically shaped trunnion and a convex shaped inner surface of the roller. Alternatively, Peterson, in U.S. Pat. No. 4,505,688, teaches the use of laminated elastomeric bearings at the interface of the mating spherical surfaces of a multiple component roller.

Otsuka et al, in U.S. Pat. No. 4,379,706, in a first embodiment, teach the use of a roller bearing disposed in an inner annular cavity of the roller which engages a trunnion having a spherical head. In an alternate embodiment, Otsuka et al teach a multiple component roller having three annular members. The inner annular member is slidably received on a cylindrically shaped trunnion and is free to move in an axial direction relative to the trunnion. An intermediate member has a concave spherical inner surface which mates with the external spherical surface of the inner member. The outer member of the roller has a contoured external surface which mates with the contoured surface of the parallel guideways provided in the outer joint member. The inner face between the outer and intermediate members of the multiple component roller have mating annular recesses which are disposed in a plurality of roller bearings. The axial displacement of the multiple component roller relative to the trunnion is provided by the sliding of the inner member of the roller bearing on the cylindrical surface of the trunnion as taught by Drevard et al, Orain, and Peterson as discussed above.

A multiple component roller is taught by Orain, in U.S. Pat. No. 4,472,156, which is comparable to that taught by Otsuka et al except that it is mounted on a spherically shaped trunnion and no provisions are made for radial displacement of the roller relative to the trunnion.

SUMMARY OF THE INVENTION

An anti-shudder tripod constant velocity universal joint has an outer member and an inner member. The outer member has a cavity having three longitudinal lobes equally spaced about an axis of rotation. Each longitudinal lobe has a pair of opposing side walls and each of the opposing side walls define a longitudinal guideway. The inner member is disposed within the outer member and has a spider member supporting three radially extending trunnions in a plane normal to the axis of rotation of the spider member. Each trunnion is disposed in a respective one of the lobes of the cavity. A multiple component roller has an annular inner race member pivotably attached to the trunnion and an annular roller member circumscribing the inner race member and engaging the guideways defined by the side walls of the respective lobes. A plurality of roller bearings are disposed between the inner race member and the roller member to rotatably support the roller member about the inner race member. Means are provided for limiting the axial displacement of the roller member relative to the inner race member to maintain the position of the roller member relative to the guideways defined by the side walls of the outer member when the inner member is angularly disposed to the outer member.

A first object of the invention is to eliminate the shudder in the tripod constant velocity universal joint by eliminating sliding friction between the roller and the longitudinal guideways of the outer joint member.

Another object of the invention is a pivotable multiple component roller for a tripod constant velocity universal joint which will remain parallel to the longitudinal raceways of the outer joint member.

Still another object of the invention is a multiple component roller which has an inner race member pivotably attached to a trunnion having a spherical surface engaged by the inner race member.

Still another object of the invention is a roller member which is axially movable with respect to the inner race member.

Another object of the invention is a roller member in which the axial displacement of the roller member is along the surface of the roller bearings.

These and other objects of the invention will become more apparent to one skilled in the art from a reading of the specification in conjunction with the drawings.

BRIEF DESCRIPTION OF THE DRAWINGS

FIG. 1 is a partial cross-sectional side view of a tripod constant velocity universal joint embodying a multiple component roller; and FIG. 2 is a cross-sectional edge view of the multiple component roller.

DETAILED DESCRIPTION OF THE PREFERRED EMBODIMENT

Referring to FIG. 1, there is shown a tripod constant velocity joint or universal joint having an outer member 10 and an inner member 12. The outer member 10 has an outer housing 14 to which a shaft 16 is concentrically attached. As is known in the art, the outer housing 14 may be circular in form or a forged tulip-shaped body having longitudinal cavity 18 formed therein. The longitudinal cavity 18 has a cylindrical central portion and three connecting longitudinal lobes 20 equally spaced about the central cylindrical portion. Each longitudinal lobe 20 has a pair of opposing side walls 22 and 24 as more clearly shown in FIG. 2. The side walls 22 and 24 have concave surfaces which define a track or longitudinal guideway for a multiple component roller 26 attached to the inner member 12.

The inner member 12 has a spider member 28 which is attachable to a shaft 30 by means of mating splines as is known in the art. The spider member 28 has three radially extending trunnions 32 which lie in a common plane normal to the axis of rotation 34 of the shaft 30.

The trunnions 32 radially extend into each of the three longitudinal lobes 20 and are disposed between the guideways formed by the side walls 22 and 24. The portions of external surfaces 36 and 38 of each of the trunnions facing the side walls 22 and 24, respectively, are spherically shaped. As is known in the art, the external surfaces of the trunnions 32 normal to the axis of rotation 34 of the shaft 30 may be flat or have any other convenient configuration.

The details of the multiple component roller 26 are shown in FIG. 2. The multiple component roller 26 has an annular inner race member 40 which has a concave inner surface 42 which mates with the spherically shaped portion of the external surfaces 36 and 38 of the trunnions 32. The inner race member 40 also has a cylindrically shaped outer surface 44 which has a circumferential lip 46 at one end. The inner race member 40 also has an annular shoulder 48 and an annular snap ring groove 50 provided at the end opposite the circumferential lip 46.

The multiple component roller 26 further has an annular roller member 52 circumscribing the inner race member 40. The annular roller member 52 has a convex or spherically shaped outer surface 54 which mates with the concave surface of the side walls 22 and 24 and a cylindrically shaped inner surface 56 spaced a predetermined distance from the cylindrically shaped outer surface 44 of the inner race member 40 to form an annular roller bearing cavity. A plurality of needle or roller bearings 58 are disposed in the annular roller bearing cavity between the cylindrically shaped outer surface 44 of the inner race member 40 and the cylindrically shaped inner surface 56 of the annular roller member 52. The cylindrically shaped outer surface 44 of the inner race member 40 and the cylindrically shaped inner surface 56 of the annular roller member 52, respectively, serve as inner and outer bearing races for the roller bearings 58, respectively.

The needle or roller bearings 58 are longitudinally captivated between the circumferential lip 46 and a retainer ring 60 seated on the annular shoulder 48. A snap ring 62 locks the retainer ring 60 against the annular shoulder 48.

The thickness of the annular roller member 52 is less than the width of the cylindrically shaped outer surface 44 of the inner race member 40 between the circumferential lip 46 and the retainer ring 60, permitting the annular roller member 52 to be axially displaced relative to the inner race member 40 along the surfaces of the roller bearings 58 in a direction parallel to the axis of the trunnions 32. This permits the annular roller member 52 to maintain its position in the guideway defined by the cylindrically shaped side walls 22 and 24 when the inner member 12 is angularly disposed relative to the outer member 10. This also prevents the multiple component roller 26 from binding up on the side walls 22 and 24 when the inner and outer members are angularly disposed relative to each other.

The outside diameter of the circumferential lip 46 and the retainer ring 60 are preferably larger than the diameter of the cylindrically shaped inner surface 56 of the annular roller member 52 so as to limit the axial displacement of the annular roller member 52 relative to the inner race member 40. The limitation of the axial displacement of the annular roller member 52 maintains the cylindrically shaped inner surface 56 of the roller member in full rolling contact with the needle or roller bearings 58.

In operation, the mating spherical surfaces of the inner race member 40 and the trunnions 32 allow the multiple component roller 26 to remain parallel to the longitudinal concave surfaces of the side walls 22 and 24 of the outer member 10 when the inner member 12 is angularly displaced relative to the outer member 10. The smaller thickness of the annular roller member 52 relative to the width of the inner race member's cylindrically shaped outer surface 44 permits the annular roller member 52 to maintain its position relative to the side walls 22 and 24 so that the only friction encountered in the operation of the universal joint is a rolling friction of the rollers along the concave longitudinal guideways. As a result, all sliding friction between the roller and the guideways are eliminated which effectively eliminates all shuddering of the constant velocity joint.

It is not intended that the invention be limited to the structures illustrated in the drawings and discussed in the detailed description of the invention. It is recognized that others skilled in the art may make certain structural modifications within the scope of the invention as disclosed herein and set forth in the appended claims.

What is claimed is:

1. An anti-shudder constant velocity universal joint comprising:

an outer member having an internal cavity, said internal cavity having three longitudinal lobes equally spaced about an axis of rotation, each longitudinal lobe of said three longitudinal lobes having a pair of opposing side walls and each of said opposing side walls defining a longitudinal guideway parallel to said axis of rotation;

an inner member disposed in said outer member, said inner member having a spider member supporting three radially extending trunnions in a plane normal to an axis of rotation of said spider member, each trunnion of said three trunnions being disposed in a respective one of said longitudinal lobes between said longitudinal guideways; and a multiple component roller attached to each trunnion of said three radially extending trunnions, each multiple component roller having an annular inner race member pivotably attached to said trunnion and an annular roller member circumscribing said inner race member engaging said longitudinal guideways, and a plurality of roller bearings disposed between said inner race member and said annular roller member to rotatably support said annular roller member about said inner race member, and each of said multiple component roller bearings further having means for providing limited axial displacement of said annular roller member relative to said inner race member to maintain the position of said annular roller member relative to said longitudinal guideways when said inner member is angularly disposed to said outer member.

2. The constant velocity universal joint of claim 1 wherein said longitudinal guideways defined by said opposing side walls of each longitudinal lobe have a concave longitudinal surface and wherein said annular roller member has a convex external surface mating with said concave longitudinal surface of said longitudinal guideways.

3. The constant velocity universal joint of claim 1 wherein at least opposite surface portions of each said trunnion which face said longitudinal guideways have a spherical shape and wherein said inner race member has a concave inner surface mating with the spherical shape of said at least opposite surface portions of each said trunnion.

4. The constant velocity universal joint of claim 3 wherein said inner race member has a cylindrically shaped outer surface, said annular roller member has a cylindrically shaped inner surface spaced from said cylindrically shaped outer surface of said inner race member, and wherein said plurality of roller bearings are disposed in the space between said cylindrically shaped outer surface of said inner race member and said cylindrically shaped inner surface of said annular roller member.

5. The constant velocity universal joint of claim 4 wherein said means for providing limited axial displacement of said annular roller member comprises:

a circumferential lip extending outward from said cylindrically shaped outer surface of said inner race member at one end thereof; said circumferential lip having a diameter greater than the diameter of said cylindrically shaped inner surface of said annular roller member;

an annular shoulder provided at the opposite end of said cylindrically shaped outer surface of said inner race member spaced from said circumferential lip by a distance greater than the thickness of said annular roller member;

a retainer ring seated on said annular shoulder, said retainer ring having an external diameter larger than the diameter of said cylindrically shaped inner surface of said annular roller member; and means for locking said retainer ring on said annular shoulder.

6. The constant velocity universal joint of claim 5 wherein said plurality of roller bearings have a length slightly less than said distance between said annular shoulder and said circumferential lip.

7. A tripod constant velocity universal joint of tle type having an outer joint member and an inner joint member, wherein said outer joint member comprises an internal cavity having three longitudinal lobes equally spaced about an axis of rotation for said outer joint member, each longitudinal lobe having a pair of side walls defining a pair of spatially separated longitudinal guideways parallel to said axis of rotation, wherein said inner joint member has a spider member supporting three radially extending trunnions in a plane normal to the axis of rotation of said spider member, each trunnion of said three trunnions extending into a respective one of said three longitudinal lobes between said spatially separated guideways, and a roller rotatably attached to each trunnion which rollingly engages said spatially separated guideways, the improvement comprising:

an inner race member of a multiple component roller pivotably attached to each said trunnion;

a roller member of said multiple component roller circumscribing said inner race member, said roller member having an outer surface engaging said spatially separated longitudinal guideways on each side of each said trunnion;

a plurality of roller bearings disposed between said inner race member and said roller member to rotatably support said roller member relative to said inner race member; and means for providing limited axial displacement of said roller member relative to said inner race member to maintain the radial position of said roller member relative to said axis of rotation of said outer joint member when said inner joint member is angularly disposed to said outer joint member.

8. The improvement of claim 7 wherein said spatially separated guideways have concave cylindrically shaped surfaces and wherein said outer surface of said roller member is a convex surface having a radius of curvature corresponding to a radius of curvature of said concave cylindrically shaped surfaces of said spatially separated guideways.

9. The improvement of claim 7 wherein at least opposite surface portions of each said trunnion which are adjacent to said spatially separated guideways in each said lobe have a spherical shape and wherein said inner race member has an inner surface which pivotably engages each said trunnion, said inner surface having a concave shape which mates with said spherical shape of said at least opposite surface portions of each said trunnion.

10. The improvement of claim 9 wherein said inner race member has a cylindrically shaped outer surface, said roller member has a cylindrically shaped inner surface spaced from said cylindrically shaped outer surface of said inner race member, and wherein said plurality of roller bearings are disposed in the annular space between said cylindrically shaped outer surface of said inner race member and said cylindrically shaped inner surface of said roller member.

11. The improvement of claim 10 wherein said means for providing limited axial displacement of said roller member comprises:

a circumferential lip extending outward from said cylindrically shaped outer surface of said inner race member at one end thereof, said circumferential lip having a diameter greater than said cylindrically shaped inner surface of said roller member;

an annular shoulder provided on said inner race member at the end opposite said circumferential lip, said annular shoulder being spaced from said circumferential lip a distance greater than the thickness of said roller member;

a retainer ring seated on said annular shoulder, said retainer ring having an external diameter larger than the diameter of said cylindrically shaped inner surface of said roller member, said roller member being captivated between said annular lip and said retainer ring; and means for locking said retainer ring on said annular shoulder.

12. The improvement of claim 11 wherein said plurality of roller bearings have a length corresponding to said distance between said circumferential lip and said annular shoulder.

13. A multiple component roller for a tripod constant velocity universal joint of the type having an outer joint member which has three lobes equally spaced about an axis of rotation, each lobe having a pair of face-to-face longitudinal roller guideways parallel to said axis of rotation, and an inner joint member which has three radially extending trunnions, each of said three radially extending trunnions extending into a respective one of said three lobes, each of said three radially extending trunnions pivotably and rotatably supporting a roller which is guided along said pair of face-to-face longitudinal roller guideways of its associated lobe, said multiple component roller comprising:

an annular inner race member pivotably attached to each said trunnion, said annular inner race member having a cylindrically shaped outer surface which serves as an inner bearing race;

an annular roller member circumscribing said annular inner race member, said annular roller member having an outer surface which engages and is guided by said pair of face-to-face longitudinal roller guideways and a cylindrically shaped inner surface which has an outer bearing race, said cylindrically shaped inner surface of said annular roller member being spaced from said cylindrically shaped outer surface of said annular inner race member to form an annular bearing space, and said annular roller member having a thickness less than the thickness of said cylindrically shaped outer surface of said annular inner race member;

a plurality of roller bearings disposed in said annular bearing space to rotatably support said annular roller member relative to said annular inner race member; and means for providing limited axial displacement of said annular roller member relative to said annular inner race member to keep said cylindrically shaped inner surface of said annular roller member in rolling contact with said plurality of roller bearings.

14. The multiple component roller of claim 13 wherein each said trunnion has spherical surface portions, and wherein said annular inner race member has a concave inner surface which engages said spherical surface portions of each said trunnion to pivotably attach said annular inner race member to each said trunnion, said concave inner surface of said annular inner race member having a radius of curvature corresponding to the radius of said spherical surface portions of each said trunnion.

15. The multiple component roller of claim 13 wherein said means for limiting the axial displacement of said annular roller member comprises a circumferential lip extending from one end of said cylindrically shaped outer surface of said annular inner race member and a retainer ring attached to the other end of said cylindrically shaped outer surface, said circumferential lip and said retainer ring confining the axial displacement of said annular roller member to maintain said cylindrically shaped inner surface of said annular roller member in rolling contact with said plurality of bearings.

* * * * *